United States Patent Office 3,208,429
Patented Sept. 28, 1965

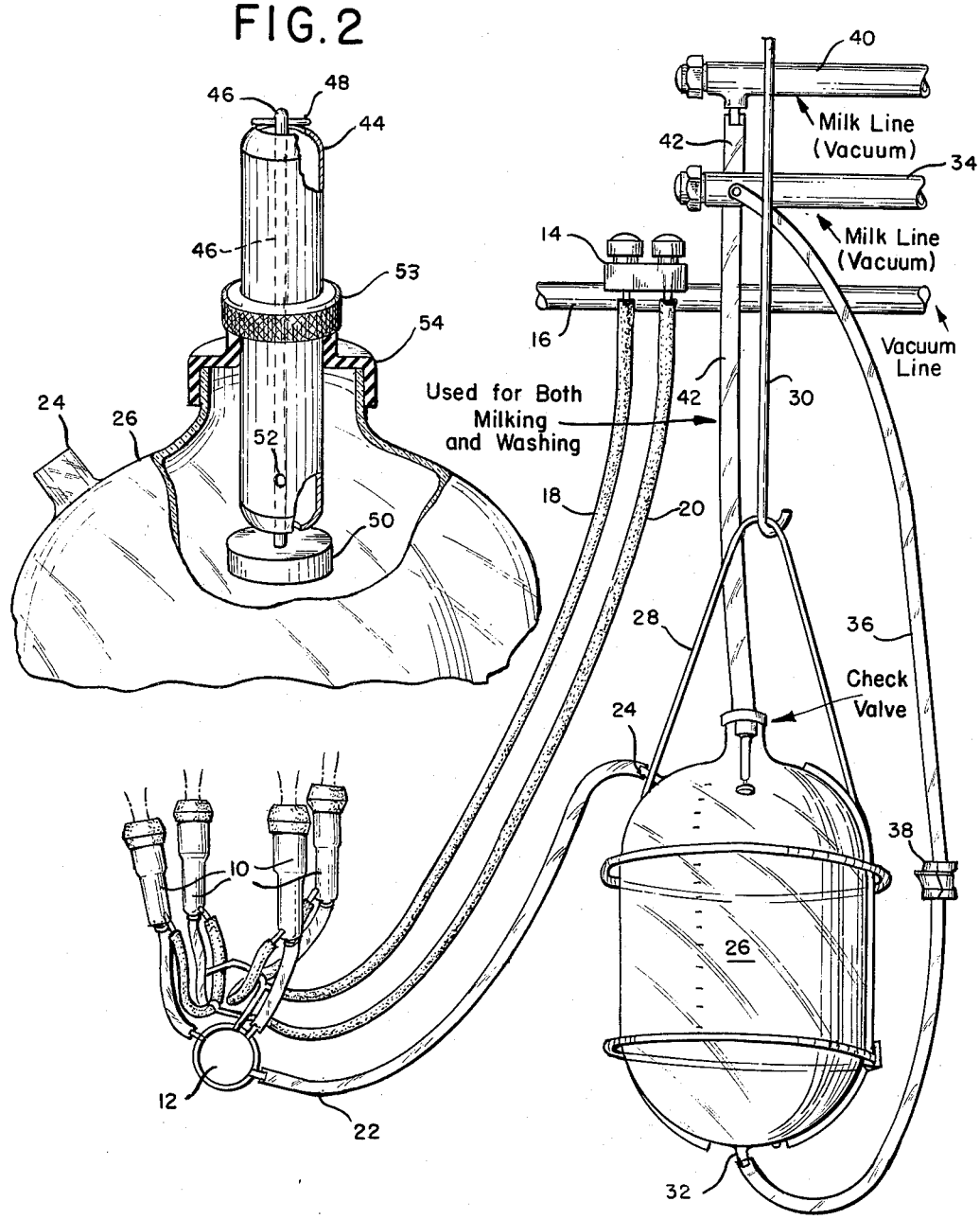

3,208,429
WEIGH JAR CHECK VALVE FOR MILKING SYSTEMS
Daniel O. Noorlander, Madison, Wis., assignor to Dairy Equipment Company, Madison, Wis., a corporation of Wisconsin
Filed Feb. 15, 1963, Ser. No. 258,723
7 Claims. (Cl. 119—14.44)

This invention relates to weigh jars used in milking systems and particularly to a combined check valve and washing aid for giving better control over the vacuum in the system and for making it possible to wash the jar in place.

The principal object of this invention is to provide a check valve assembly for weigh jars to prevent serious loss of vacuum in a milking system when the teat cups supplying the jar are removed from the cow.

Another object is to provide such a check valve which will automatically reset itself when the teat cups are connected to a cow.

A further object is to provide such a check valve which will aid in washing the jar in place by serving as a deflector.

The foregoing objects are attained by provision of a check valve which will close when the pressure drop across the valve exceeds 3" Hg. A bypass is provided to allow a 3" bleed so that when the teat cups are connected to a cow the vacuum line can draw down the pressure. When the vacuum comes back to within 3" of the milking vacuum the check valve will automatically re-open. When the system is reverse flushed for washing the washing solution will hit the valve which is positioned at the top of the jar to serve as a deflector to spray the solution over the entire interior of the jar.

Other objects and advantages will be pointed out in, or be apparent from, the specification and claims, as will obvious modifications of the single embodiment shown in the drawings, in which:

FIG. 1 is a schematic showing of the jar in a typical system; and

FIG. 2 is an enlarged detail of the check valve assembled in the jar.

In FIG. 1 the teat cups 10 are shown connected to the cow to deliver milk to claw 12 in the usual manner. The cups are under control of the pulsator 14 mounted on vacuum line 16 and connected to the cups through vacuum hoses 18 and 20. Milk flows from the claw 12 through hose 22 which is connected to nipple 24 on weigh jar 26 which is supported in the frame 28 suspended from hook 30 in the usual manner. The weigh jar is provided with graduations on the side to show the volume or weight. The nipple 32 at the bottom of the jar 26 is connected to the milk line 34 by hose 36 which is provided with a suitable clamp 38. The interior of the jar 26 is under vacuum by reason of the fact that the top of the jar is connected to the vacuum line 40 by hose 42 which fits over the upper end of tube 44. This tube has each end rolled in to provide aligned apertures through which stem 46 passes. The stem is retained in place by means of a retaining pin 48 passing through the upper end of the stem and resting against the inturned end of the tube 44. The lower end of pin 46 projects through the bottom opening of tube 44 and carries a valve 50 which is close to but out of contact with the bottom opening in tube 44. The tube is additionally provided with a knurled ring 53 press fitted on the exterior of the tube and serving as a seat for the flexible rubber seal 54, the skirt of which snugly fits over the neck of the jar. Since the vacuum hose 42 slips over the upper end of tube 44 to evacuate the jar it will be appreciated that pressure acting on the flexible rubber connector 54 will seal the system at this point.

Milk coming into the system during the milking operation will fill jar 26 while vacuum is applied to the claw through hose 42. During milking the pinch-off clamp 38 serves to prevent flow of milk from the jar so that on conclusion of the milking the amount of milk from the cow can be determined and entered in the records. To empty the jar the clamp 38 is opened and the claw is opened to let air rush into the jar so that the vacuum can lift the milk from the jar to the milk line 34.

When the teat cups 10 are removed from the cow air tends to rush into the jar and, of course, during the time in which it is desired to empty the jar air is deliberately introduced to the jar. In either event, sufficient air can enter the system so as to have a serious effect on the vacuum in lines 34, 40, or 16 and this can, therefore, be reflected in adverse milking conditions at another location. To eliminate this problem I have provided the check valve 50.

When the air rushes into the jar when the cups 10 are removed from the cow or when the claw is deliberately vented the inrush of air acting across valve 50 will serve to lift valve 50 to seat against the bottom of tube 44 and, therefore, this serves to check the amount of air flowing through hose 42. An orifice 52 is provided in the side of tube 44 to provide a predetermined bleed of air past the check valve 50. This amounts to about three inches of mercury. The purpose of this is that when the teat cups are hooked up to another cow there will be some vacuum in the jar 26 to start drawing the vacuum at the teat cups. When the vacuum in the jar and, hence, at the cups has come to about three inches of the milking vacuum the weight of valve 50 will cause the valve to open automatically and permit full milking vacuum to be applied to the claw and cups. Other arrangements not providing the orifice for bleed as just described can be provided but these require that the check valve then be re-opened manually which is somewhat undesirable in that the farmer is quite busy enough without having to do one more thing.

A further advantage of the present construction lies in the fact that it facilitates washing the jar without removing the jar from the system. When the jar is to be washed hose 22 is pulled off of nipple 24 and the nipple is capped. The cleansing solution is then introduced through line 40 while the vacuum is maintained on line 34 and clamp 38 is open. Therefore, the cleansing solution will flow down through the tube 44 and splash against the valve 50. The flat surface of the valve serves to deflect the incoming wash solution up into the neck of the jar and over the entire upper portion of the jar so as to get a uniform spreading of the wash solution throughout the jar prior to its removal through the bottom nipple 32 through the hose 36. If desired, the upper surface of valve 50 could be even cup shaped to achieve greater deflection if this was felt necessary although experience to date indicates Although but one embodiment, of the present invention has been illustrated and described, it will be apparent to those skilled in the art that various changes and modifications may be made therein without departing from the spirit of the invention or from the scope of the appended claims.

I claim:

1. In a weigh jar having a milk inlet near the top of the jar, a milk outlet at the bottom of the jar, a vacuum connection at the top of the jar, a valve seat at said connection, a check valve adjacent the seat and biased therefrom but responsive to an abnormal air flow out of the jar past the valve to close on the seat.

2. Apparatus according to claim 1 including a bleed orifice bypassing the valve whereby the valve will re-open upon the pressure drop thereacross falling below a predetermined value.

3. Apparatus according to claim 1 in which wash solution may be introduced through the connection and the valve is positioned to deflect and spread the solution throughout the jar interior.

4. Apparatus according to claim 1 in which the connection comprises a tubular connector sealingly mounted in the neck of the jar, said valve being carried on a stem passing through the connector and having a face generally normal to the connector axis for seating against the lower end of the connector and for deflecting incoming wash solution over the jar interior.

5. Apparatus according to claim 4 including an orifice in the tube inside the jar to bypass the check valve and to allow the valve to re-open when the pressure drop across the valve is below a predetermined value.

6. A weigh jar having a milk inlet and a milk outlet and an air outlet, a check valve in the air outlet, said check valve being biased open and operative to close in response to a abnormal air flow out of the jar through the air outlet.

7. A jar according to claim 6 including a bleed orifice bypassing the check valve to facilitate reopening of the check valve when the air flow through and, hence, the pressure drop across the air outlet tends to normalize.

References Cited by the Examiner

UNITED STATES PATENTS

| 1,420,035 | 6/22 | Hall | 137—534 |
| 2,591,060 | 4/52 | Garretson | 137—513.3 |
| 2,775,223 | 12/56 | Pickavance | 119—14.07 |
| 2,786,445 | 3/57 | Golay | 119—14.07 |
| 2,808,025 | 10/57 | Graves | 119—14.18 |
| 2,888,038 | 5/59 | Smalley | 137—534 |

FOREIGN PATENTS 214,841  4/58  Australia.

SAMUEL KOREN, *Primary Examiner.*

HUGH R. CHAMBLEE, *Examiner.*

UNITED STATES PATENT OFFICE
CERTIFICATE OF CORRECTION

Patent No. 3,208,429

September 28, 1965

Daniel O. Noorlander

It is hereby certified that error appears in the above numbered patent requiring correction and that the said Letters Patent should read as corrected below.

Column 2, line 56, after "indicates" insert -- that a flat surface works quite well enough. --.

Signed and sealed this 3rd day of May 1966.

(SEAL)
Attest:

ERNEST W. SWIDER
Attesting Officer

EDWARD J. BRENNER
Commissioner of Patents